United States Patent [19]
Breer et al.

[11] 3,771,963
[45] Nov. 13, 1973

[54] PRODUCTION OF FOAMS AND HOMOGENEOUS MATERIALS AND APPARATUS THEREFOR

[75] Inventors: Karl Breer, Cologne; Klaus Schulte, Leverkusen, both of Germany

[73] Assignee: Bayer Aktiengesellschaft, Leverkusen, Germany

[22] Filed: June 21, 1971

[21] Appl. No.: 155,087

[30] Foreign Application Priority Data
June 26, 1970 Germany.................. P 20 31 739.9

[52] U.S. Cl.............. 23/252 R, 259/4, 260/2.5 EP, 260/2.5 N, 260/2.5 BD, 425/120, 425/257
[51] Int. Cl....... B01f 5/06, B01f 15/00, C08f 47/00
[58] Field of Search...................... 23/252 R, 285 X, 23/285 S; 259/4; 425/110, 120, 130, 257; 239/407, 410, 412, 413, 417.5, 533

[56] References Cited
UNITED STATES PATENTS
3,068,075 12/1962 Boekemeier...................... 23/252 R
3,169,833 2/1965 Breer et al......................... 23/252 R Primary Examiner—Joseph Scovronek
Attorney—Ralph D. Dinklage et al.

[57] ABSTRACT

In the production of moulded articles from at least two components wherein the components at elevated pressure are released into a mixing chamber at a lower pressure and the release of pressure is utilized in the mixing of the components, and the mixed components are discharged from the mixing chamber into a mould, the two components are combined at elevated pressure and are then immediately introduced into the mixing chamber.

7 Claims, 3 Drawing Figures

PRODUCTION OF FOAMS AND HOMOGENEOUS MATERIALS AND APPARATUS THEREFOR

BACKGROUND

The invention relates to a process for the production of foams or other, e.g., homogeneous, materials from at least two inter-reacting components which are injected under over-pressure and mixed together in a mixing zone for a residence time of at least 1/1,000 sec., after which the mixture is discharged from the mixing zone and left to react to completion. The invention also relates to an apparatus for carrying out this process. Suitable chemical components of the kind under discussion include, in particular, those based on polyurethane, unsaturated polyesters, epoxide resin, $\epsilon$-caprolactam and their copolymers.

In conventional processes, the reaction components are generally sprayed into a mixing chamber in opposite directions to one another. The disadvantage of this is that a separate inlet nozzle has to be provided for each component, with the result that, apart from the considerable outlay involved in high technical resources of apparatus, the mixing head through its excessive weight becomes unfavourably conspicuous, especially in portable equipment. From the point of view of process technology, disadvantages arise during mixing when one of the components is sprayed in a relatively small quantity in comparison with the other or when the injection pressures differ widely from one another, in which case poor mixing is obtained.

THE INVENTION

The objects of the present invention are to provide a process which enables the components to be more effectively mixed together and to provide an apparatus for carrying out this process. The disadvantages mentioned are overcome. Notably, the apparatus is less cumbersome than the prior art devices.

According to the invention, this object is achieved by separately guiding the components, combining them immediately before spraying, and then spraying them together into the mixing zone.

In this way, the two components joined with one another to form a single stream or jet generate particularly intense turbulence in the mixture as it is sprayed into the mixing zone and at the same time are mixed particularly intensively before leaving the mixing zone.

In one particular embodiment of the process according to the invention intended for the introduction of additives such as fillers, dyes and reinforcing fibres into flowable plastics compositions, the additives are used instead of one of the reaction components. This embodiment is of particular advantage in cases where the compositions in question are plastic, viscous compositions into which additives of this kind cannot be introduced with the requisite degree of homogeneity by conventional techniques. In general the invention is concerned with combining components which are in the liquid state. Where reinforcing fibres or other solids are used, they are combined with one of the components in liquid state before the joining according to the invention of multiple components.

The process according to the invention is carried out in an apparatus comprising a mixing head with a mixing chamber into which open a number of inlet nozzles corresponding to the number of components and connected to feed pipes, and which has at least one outlet opening. The novel feature is that the inlet nozzles are in the form of a multiple-component nozzle with separate feed ducts for each component which merge with one another in front of the common nozzle orifice so that the junction can be interrupted while the nozzle is inoperative.

Multiple-component nozzles have already been used as mixing nozzles for the production of foams. An apparatus of this kind is described in German Pat. Specification 832,493, in which the components are not joined until after they have emerged from the nozzle, and are mixed together outside of the nozzle. Accordingly, the mixing effect is poor because some particles of the components are sprayed unmixed into the surrounding space with the result that they are unable to react with one another. Over this, the apparatus according to the invention has the specific advantage that particularly intense turbulence is generated in the mixture through the presence of the mixing zone and the components have a minimum residence time in the mixing chamber even in cases where the continuous mixing technique is used.

In one particularly favourable embodiment of the apparatus according to the invention, a spring-loaded nozzle needle guided in the nozzle housing, for delivering the first component, has a bore through it communicating with the interior of the housing which can be shut off from the feed pipe by means of a valve, whilst for delivering the second component a second bore in the nozzle housing opens at the nozzle needle which is provided with a sealing surface which in the inoperative state rests on a co-operating surface on the nozzle housing which is arranged in front of the nozzle orifice in the direction of flow, whilst in the operative state the second bore communicates with the nozzle orifice. In this way, both components issue simultaneously from the nozzle orifice when the needle is raised so that it is impossible for either of the components to precede or follow after the other which would result in faults in the finished product. Faults occur when one of the components precedes the other because some of this component then enters the mould unmixed, forming a cavity in that particular region.

The second bore preferably widens into a duct which circularly surrounds the end part of the nozzle needle. The particular advantage of this is that during spraying the centrally guided component is concentrically surrounded by the second component and in this way the common jet is sprayed into mixing chamber. By virtue of the fact that the surrounding jet has all over the same thickness, the components are particularly effectively distributed.

In another special embodiment, the mixing chamber is arranged in the mould to be filled or in the hollow workpiece which is to form the outer skin of the article produced, separately from the multiple-component nozzle in the form of a "lost" mixing chamber. In this case, the mixing chamber can be removed from the mould or workpiece after filling, or alternatively it can be left in the wall of the mould or hollow workpiece. In the latter case, the mixing chamber can be lost in the process, i.e., integrated with the article produced. A mixing chamber of this kind is readily made in the form of a plastics injection moulding which makes it extremely inexpensive. Using it once is still cheaper than the losses otherwise incurred through cleaning time and cleaning agents.

By virtue of the particular design of the multiple-componnent nozzle, it is possible with particular advantage in one particular embodiment to arrange a baffle surface in the mixing chamber opposite the nozzle orifice. In this way, the components undergo still more intense mixing during the mixing and spraying operations.

Providing the mixing head with a multiple-component nozzle in accordance with the invention also makes the mixing head particularly slim which solves another serious problem, namely filling long narrow cavities such as pipes or bores, with foam. By virtue of the slim design, the mixing head can be lowered into these pipes or bores and withdrawn at the same time the mixture is introduced so that the inlet zone for the mixture is somewhat displaced with the foaming rate in the pipe or in the bore. In this way, particularly uniform fitting is obtained, especially in the case of foams, which in turn guarantees uniform strength properties.

Accordingly, the invention is concerned with a process of producing moulded articles from at least two components, wherein the components at elevated pressure are injected into a mixing chamber at a lower pressure whereupon sudden reduction in pressure of the components occurs. The components thoroughly mix in the mixing chamber utilizing the reduction in pressure to effect mixing of the components. The thoroughly mixed components are discharged from the mixing chamber to the mould. The invention provides the improvement which comprises combining the two components at elevated pressure and immediately thereafter introducing the two components into the mixing chamber.

The apparatus provided by the invention comprises a housing having a first and second inlet opening for respective reactants and a discharge opening for discharge of the reactants together from the housing. Also provided is a first duct for communicating the first inlet opening with the discharge opening, and a second duct for communicating the second inlet opening with the discharge opening. The first duct has a valve therein and is outfitted with means disposed downstream of the valve for selectively interrupting communication of the second inlet opening and the discharge opening.

The last mentioned means can comprise an axially movable stem downstream of the valve and disposed in the first duct. The stem terminates in an end tip for being received in the discharge opening, and is axially movable into and out of receipt in the discharge opening. The end portion of the stem including said tip is in sliding sealing relation with the duct and has an axially extending bore communicating the duct with the discharge opening. The second duct extends from the second inlet opening to adjacent the discharge opening for communicating the second inlet opening and the discharge opening when the stem is out of said receipt with the discharge opening. When the end tip of the stem is received in the discharge opening, it seals the discharge opening from the second duct.

THE DRAWINGS

The accompanying drawing diagrammatically shows two embodiments of the apparatus according to the invention, each of which is illustrated on an enlarged scale in the form of a longitudinal section.

Figure 1:
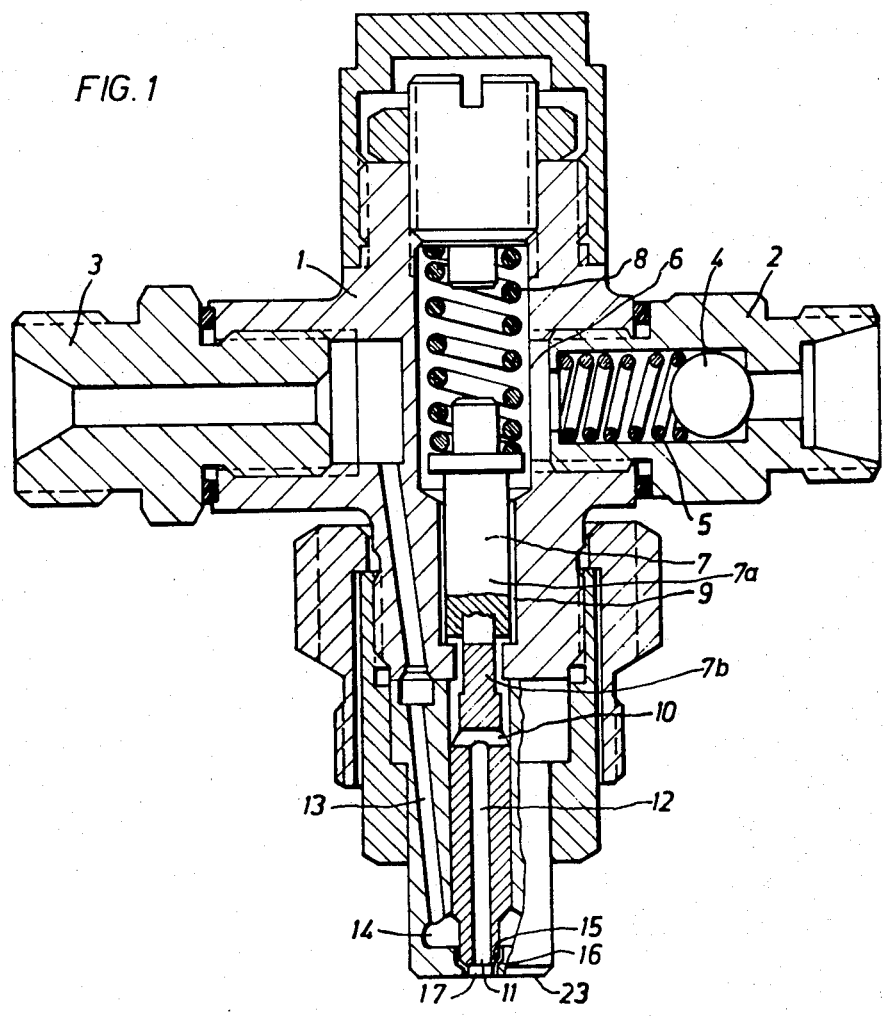
FIG. 1 shows a gun without the mixing chamber.

As shown in FIG. 1, two inlet openings are defined by sockets 2 and 3 arranged in the housing 1. A ball valve 4 loaded by a spring 5 is provided in the socket 2. The first component under elevated pressure flows through this valve 4 into the interior 6 of the housing where a nozzle needle 7 composed of upper part 7a and lower part 7b, is under the closing pressure of the spring 8. Part of the shaft of the nozzle needle 7 is surrounded by an annular gap 9 at the end of which the nozzle needle 7 has radial bores 10. From the orifice 11 of the nozzle needle 7, a central bore 12 extends up to the radial bores 10 so that the component can flow out of the interior 6 of the housing through the annular gap 9, the radial bores 10 and the central bore 12. Branching off from the socket 3 for the second component under elevated pressure, there is a duct or bore 13 which opens into an annular chamber 14 surrounding the end of the nozzle needle 7 when the nozzle is inoperative. The nozzle needle 7 has a sealing surface 15 which when the nozzle is closed rests against a counter surface 16, forming a seal. In the vicinity of and below the annular chamber 14 the end of the nozzle needle 7 is smaller in diameter than the rest of the nozzle shaft. In this way the nozzle neelde 7 is raised when the second component is placed under pressure whilst at the same time the ball valve 4 is opened when the first component is placed under pressure. Thus, the first component can flow through the central bore 12 of the nozzle needle 7 and the second component through the bore 13 and the annular chamber 14 to the gun discharge opening or nozzle orifice 17 through which they are ejected.

Figure 2:
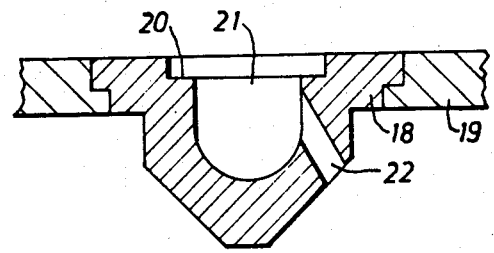
FIG. 2 shows a "lost" mixing chamber which can be used with the gun of FIG. 1.

When the apparatus is placed on the mixing chamber shown in FIG. 2 which is fitted into the wall of a workpiece 19 (which can be a wall of a mould or the part of a shell which is to form the outer skin of the article produced), the end face 23 of the gun (FIG. 1), by resting on the shoulder 20 (FIG. 2), seals both parts from the surroundings in which the moulding is performed. The mixture is thoroughly whirled around in the mixing chamber 21 and after a short residence time leaves it through the outlet opening 22 and flows into the space to be filled with foam. The pressure in the mixing chamber is atmospheric. The mixing chamber can be circular in horizontal cross-section; have a diameter of 0.5 to 2.0 cm.; an overall inside length of 0.5 to 2.0 cm; and a volume of 0.1 to 6.0 cm³.

Figure 3:
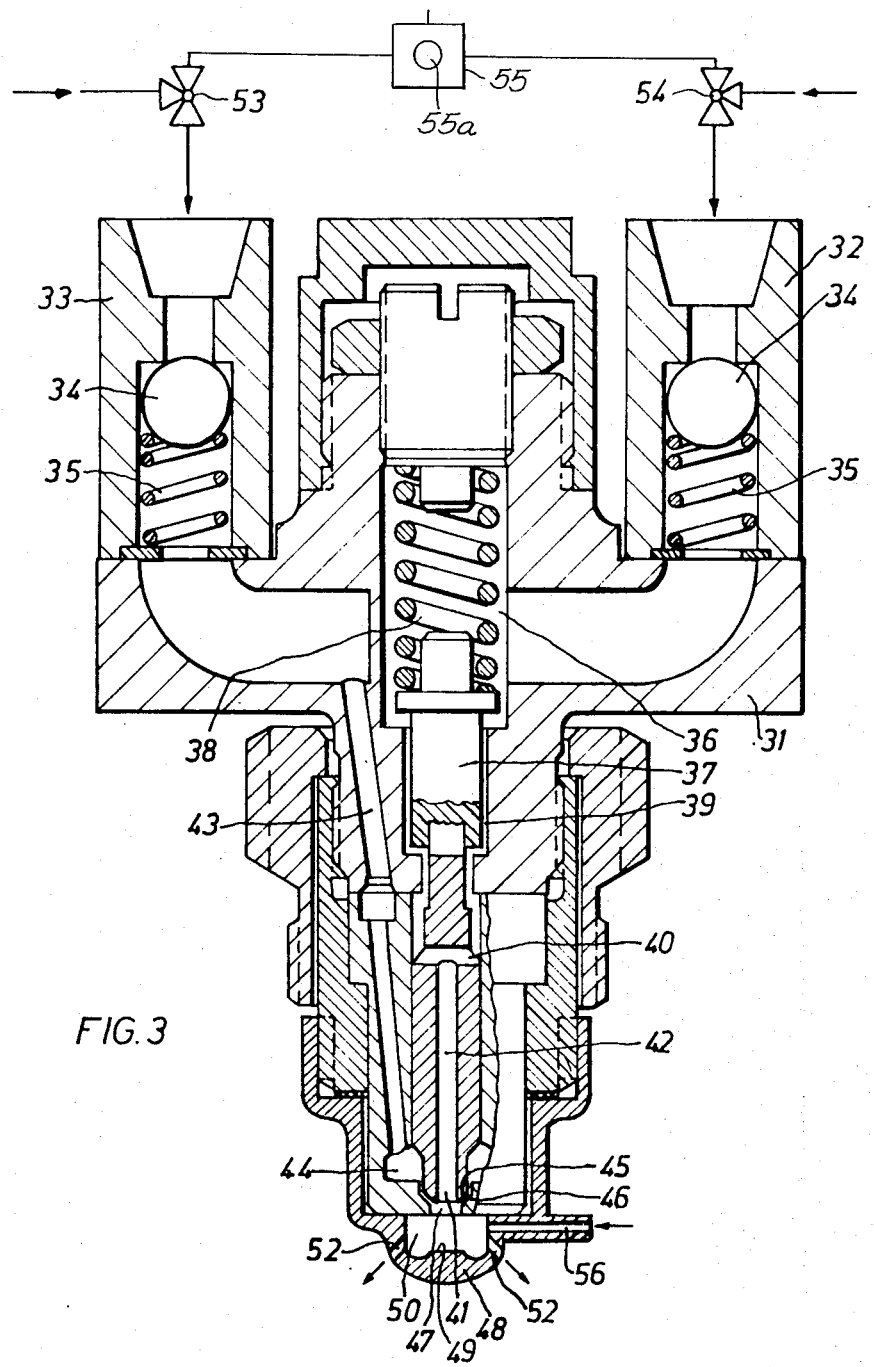
FIG. 3 shows a particularly slim gun with a mixing chamber attached to it.

In FIG. 3, connecting sockets 32 and 33 open into the housing 31. The are designed to be closed by ball valves 34 loaded by spring 35. The connecting socket 32 opens into the interior 36 of the housing in which a nozzle needle 37 loaded by a spring 38 is displaceably arranged. The centre part of the shaft of the nozzle needle 37 is surrounded by an annular gap 39 at whose end the nozzle needle 37 has radial bores 40. A central bore 42 extends from the orifice 41 of the nozzle needle 37 to the radial bores 40. A bore 43 is branched off from the connecting socket 33, oepning into an annular duct 44 which surrounds the orifice end of the nozzle needle 37. Arranged on the end of the nozzle needle 37 there is a sealing surface 45 which rest on a counter surface 46 in the housing 1 when the gun is off in such a way as to form a seal. In the working condition, i.e. with the ball valves 34 open the end of the nozzle needle 37 is raised by the pressure in the annular duct 44 and the first component flows through the bore 42 whilst the second component flows out from the annular duct 44 both into the nozzle orifice 47 whence they flow into the mixing chamber 48. Here the components are thoroughly mixed, being thrown out of the nozzle onto a baffle surface 49. Two outlets 52 branch off from the mixing chamber compartment 50. A connecting bore 56 for a rinsing means (not shown) is indicated in the Figure. The components are delivered to the connecting sockets 32 and 33 through synchronously opening valves 53 and 54 which can be simultaneously opened or closed through an actuating mechanism 55, to, respectively, communicate and isolate the ball valves from a sources of the components under pressure. Where the valves are communicated with the pressure sources, the ball valves are opened and the gun is "on" or operating, whereas with the ball valves isolated from the pressure sources, they are closed and the gun is "off" or inoperative. The mechanism 55 includes a finger switch 55a which can be depressed and immediately released. This actuates a timing device (not shown) included in actuating mechanism 55, which at the end of a set period initiates operations closing the ball valves 34.

The overall dimensions of the guns of the invention can be relatively small compared with prior art devices provided for the same service. For example the valve in FIG. 1 can have a height of about 10 to 30 cm, a width of about 2.5 to 10 cm, and a depth (not shown in FIG. 1) of about 2.5 to 10 cm. The injection pressures of the components may be the same or also different. High viscous components preferably would be injected with higher pressure than low viscous components. The injection pressure is in the range of 4 to 1,000 atmospheres, preferably from 50 to 400 atmospheres. The component with the higher pressure is introduced through 13, 14 (FIG. 1) or 43, 44 (FIG. 3).

What is claimed is:

1. Apparatus for use in combining reactants comprising:
   a. a housing having a first and second inlet opening for respective reactants and a discharge opening for discharge of the reactants combined together from the housing,
   b. a first duct for communicating the first inlet opening with the discharge opening,
   c. a second duct for communicating the second inlet opening with the discharge opening,
   d. said first duct having a valve therein, and an axially movable stem downstream of the valve and disposed therein, terminating in an end tip being received in said discharge opening, the stem being axially movable into and out of said receipt, a portion of the stem being in sliding sealing relation with the duct and having an axially extending bore communicating the duct with the discharge opening,
   e. means yieldingly urging the movable stem into said receipt in the discharge opening,
   f. the second duct extending from the second inlet opening to adjacent the discharge opening for communicating the second inlet opening and the discharge opening when the stem is out of said receipt with the discharge opening, the second duct terminating in a chamber disposed adjacent the discharge opening,
   g. the downstream end of the stem passing through said chamber and being reduced in cross sectional area so that pressure of a reactant in second duct and chamber tends to urge the stem out of receipt with the discharge opening.

2. Apparatus according to claim 1, and a mixing chamber for receiving the reactants issuing from the discharge opening and thoroughly mixing them together.

3. Apparatus according to claim 1, said stem when the end tip thereof is received in said discharge opening, sealing the discharge opening from the second duct.

4. Apparatus according to claim 1, said chamber forming an annulus about said stem with the stem received in the discharge opening.

5. Apparatus according to claim 2, wherein the mixing chamber is mounted on the housing.

6. Apparatus according to claim 2, and a mould for receiving the reactants, the mixing chamber being mounted on the mould.

7. Apparatus according to claim 2, the mixing chamber having a baffle surface opposite the discharge opening for improved mixing of the reactants.

* * * * *